(12) United States Patent
Xu et al.

(10) Patent No.: US 12,362,627 B2
(45) Date of Patent: Jul. 15, 2025

(54) HOUSING OF ELECTRIC MACHINE AND ASSOCIATED ELECTRIC MACHINE

(71) Applicant: ABB Schweiz AG, Baden (CH)

(72) Inventors: Hua Xu, Jiangsu (CN); Yingrui Ling, Shanghai (CN); Yang Xu, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 310 days.

(21) Appl. No.: 17/907,387

(22) PCT Filed: Mar. 10, 2021

(86) PCT No.: PCT/CN2021/080073
§ 371 (c)(1),
(2) Date: Sep. 26, 2022

(87) PCT Pub. No.: WO2021/238334
PCT Pub. Date: Dec. 2, 2021

(65) Prior Publication Data
US 2023/0123226 A1    Apr. 20, 2023

(30) Foreign Application Priority Data
May 25, 2020   (CN) .................. 202010450894.X

(51) Int. Cl.
*H02K 5/20*    (2006.01)
*H02K 5/18*    (2006.01)
*H02K 5/22*    (2006.01)

(52) U.S. Cl.
CPC .............. *H02K 5/207* (2021.01); *H02K 5/18* (2013.01); *H02K 5/225* (2013.01); *H02K 2205/09* (2013.01)

(58) Field of Classification Search
None
See application file for complete search history.

(56) References Cited

U.S. PATENT DOCUMENTS

| | | | |
|---|---|---|---|
| 5,925,947 A | 7/1999 | Kajiwara et al. | |
| 10,374,487 B2 * | 8/2019 | Ikonen | H02K 5/207 |
| 10,720,814 B2 * | 7/2020 | Lange | H02K 9/227 |

FOREIGN PATENT DOCUMENTS

| CN | 203871964 U | 10/2014 |
|---|---|---|
| CN | 205248956 U | 5/2016 |

(Continued)

OTHER PUBLICATIONS

China Second Office Action; issued by the National Intellectual Property Administration, regarding corresponding patent application Serial No. 202010450894.X; dated Mar. 28, 2022; 19 pages (with English translation).

(Continued)

*Primary Examiner* — Bernard Rojas
(74) *Attorney, Agent, or Firm* — Greenberg Traurig, LLP

(57) ABSTRACT

A machine with a housing, wherein the housing has a body formed into a cylindrical structure extending along an axial direction. The housing includes a plurality of radiation ribs extending along the axial direction and disposed circumferentially outside the body. Further, the housing includes at least one pair of ventilation windows arranged to radially protrude outward from two ends of the body in the axial direction respectively, so as to dispose a part of the plurality of radiation ribs therebetween; and at least one ventilation duct arranged radially outside the radiation ribs along the axial direction and coupled to the at least one pair of ventilation windows, enabling an internal heat radiating airstream of the electric machine to flow through the ventilation duct. The radiation ribs also can be configured at the position where the ventilation duct is disposed.

20 Claims, 5 Drawing Sheets

(56) References Cited

FOREIGN PATENT DOCUMENTS

| | | |
|---|---|---|
| CN | 105896822 A | 8/2016 |
| CN | 107276313 A | 10/2017 |
| CN | 107359730 A | 11/2017 |
| CN | 107612194 A | 1/2018 |
| CN | 107994734 A | 5/2018 |
| CN | 208401672 U | 1/2019 |
| CN | 208923975 U | 5/2019 |
| CN | 210518020 U | 5/2020 |
| CN | 111555527 A | 8/2020 |
| EP | 0776081 A1 | 5/1997 |
| EP | 0776081 B1 | 10/2002 |
| JP | H09149599 A | 6/1997 |
| JP | 2010206977 A | 9/2010 |
| JP | 2019213397 A | 12/2019 |

OTHER PUBLICATIONS

China First Office Action; issued by the National Intellectual Property Administration, regarding corresponding patent application Serial No. 202010450894.X; dated Dec. 27, 2021; 23 pages (with English translation).

International Search Report and Written Opinion, issued by the ISA/CN National Intellectual Property Administration; regarding corresponding patent application Serial No. PCT/CN2021/080073; Jun. 17, 2021; 9 pages.

* cited by examiner

HOUSING OF ELECTRIC MACHINE AND ASSOCIATED ELECTRIC MACHINE

CROSS-REFERENCE TO RELATED APPLICATIONS

This is a national stage application which claims priority to International patent application Serial No.: PCT/CN2021/080073, filed on Mar. 10, 2021, which claims priority to Chinese patent application Serial No.: 202010450894.X, filed on May 25, 2020; and which are herein incorporated by reference in their entirety.

FIELD

Embodiments of the present disclosure relate to an electric machine, and more specifically, to a housing of an electric machine.

BACKGROUND

The electric machine in the art generally may be divided into motors and generators depending on the power output form. The motors generate rotating magnetic fields using energized coils (i.e., stator windings) and applied onto rotors (e.g., squirrel-cage closed aluminum frame) to form magnetic-electrodynamic rotary torque, so as to convert the electric energy into the mechanical power. The generators are devices that convert the mechanical energy into electric power based on the similar principles. The electric machine generates a lot of heat during the operation. To avoid the adverse effect on the operation of the electric machine due to the heat accumulation, radiation ribs are often provided on the housing of the electric machine to increase a heat dissipation area, so as to dissipate the heat generated during the operation of the electric machine.

Besides, to promote air flow inside and outside the electric machine, an internal fan and an external fan are provided inside and outside the electric machine respectively and a ventilation duct extending axially is also provided outside the electric machine. Generally, there are three to four ventilation ducts, two of which are separately integrated in support parts of the housing of the electric machine, while the other one or two ducts are arranged at the upper or lateral part of the housing. The duct(s) arranged at the upper or lateral part is generally in communicate with the inside of the electric machine, thereby enabling an internal heat radiating airstream of the electric machine caused by the internal fan to flow through the ventilation ducts.

SUMMARY

Because the ventilation ducts protrude outward directly from the body of the housing, it is impossible to arrange radiation ribs at the position where the ventilation ducts are already arranged, which significantly reduces the heat dissipation area of the housing around this region. As the output power grows, the significant reduction in the heat dissipation area may lead to heat accumulation at the region and further cause local overheating. The local overheating may be detrimental to the performance and service life of the electric machine. At the present, however, the need for a high power and small volume electric machine is constantly increasing. As a result, the traditional arrangement of the housing of the electric machine restrains the development of the electric machine to some extent.

The present disclosure provides a housing of an electric machine and an electric machine using the housing to solve or at least partially solve the above issues or other potential issues in the traditional electric machine.

According to a first aspect of the present disclosure, a housing of an electric machine is provided. The housing comprises a body formed into a cylindrical structure extending along an axial direction; a plurality of radiation ribs extending along the axial direction and arranged circumferentially outside the body; at least one pair of ventilation windows arranged to radially protrude outward from two ends of the body in the axial direction respectively, so as to allow a part of the plurality of radiation ribs to be arranged therebetween; and at least one ventilation duct arranged radially outside the radiation ribs along the axial direction and coupled to the at least one pair of ventilation windows, to enable an internal heat radiating airstream of the electric machine to flow through the ventilation duct.

With the ventilation windows that protrude outward arranged between two ends of the body in the axial direction and the ventilation duct coupled to the ventilation windows and arranged radially outside, the radiation ribs also can be arranged at the position where the ventilation duct is arranged, i.e., arranged between the ventilation windows. As a result, the heat dissipation area can be effectively increased at this region, thereby avoiding heat accumulation. In this way, the output power of the electric machine can be increased without changing its internal construction. Moreover, reduction of the heat accumulation can improve the performance of the electric machine and prolong the service life of the electric machine.

In some embodiments, the housing also comprises a support part protruding outward from the body for securing the electric machine and comprising an air duct of support part extending axially and a plurality of reinforced rib plates axially arranged outside the air ducts of support part; and a plurality of auxiliary ventilation holes respectively formed to run through the reinforced rib plates and axially aligned, to enable a part of an external heat radiating airstream of the electric machine to axially flow outside the air duct of support part. By providing the auxiliary ventilation holes, the heat accumulation around the air duct of the support part can be effectively avoided, so as to improve the performance of the electric machine while increasing the output power of the electric machine.

In some embodiments, the ventilation duct comprises a radial inner sidewall, a radial outer sidewall and a circumferential wall formed between the radial inner sidewall and the radial outer sidewall, to collectively enclose an interior space of the ventilation duct. The ventilation duct adopting an enclosed structure can cause the distribution of the thermal field within the ventilation duct more reasonable, thereby improving the heat dissipation conditions of the electric machine.

In some embodiments, the radial inner sidewall comprises an opening adapted to be hermetically coupled to the ventilation windows, to allow the interior space of the ventilation duct to communicate with inside of the electric machine; and the radial inner sidewall is formed to circumferentially conform to an external contour of the radiation ribs, and is radially spaced apart from the radiation ribs by a predetermined distance, so as to radially cover at least a part of the radiation ribs from the outside. With the above arrangement, the gaps between the covered portions of the radiation ribs can ensure that the external heat radiating airstream flows at a high rate, to further improve the heat dissipation effects.

In some embodiments, the radial outer sidewall is formed to bend by a predetermined angle along a bending part extending axially, such that a distance between the radial outer sidewall and the radial inner sidewall decreases gradually from the bending part. The above arrangement makes the layout of the interior space of the ventilation duct more reasonably, thereby facilitating the air flow.

In some embodiments, the ventilation duct is made of sheet metal parts. This arrangement reduces manufacturing and processing difficulty of the ventilation duct and lowers the costs.

In some embodiments, the housing also comprises an electrical box arranged on the radial outer sidewall of the ventilation duct, for electronic elements of the electric machine to be arranged therein, wherein the electronic elements are coupled to internal components of the electric machine via cables passing through the ventilation window. This arrangement makes the overall layout of the housing of the electric machine more reasonable, thereby facilitating the circuit design of the electric machine.

In some embodiments, at least one pair of ventilation windows is formed at positions corresponding to outside of a stator of the electric machine in an axial direction. The above arrangement facilitates the communication of the ventilation duct with the positive and negative pressure zones within the electric machine, to ensure smooth air flow.

In some embodiments, the body, the plurality of radiation ribs and the support part are formed integrally by casting. In addition to increasing the strength of the housing, the above arrangement also ensures that the heat can be transferred and radiated rapidly through the housing, which further improves the heat dissipation performance.

In some embodiments, the housing also comprises a reinforced bar formed between the at least one pair of ventilation windows and extending axially, and a part of the plurality of radiation ribs is formed on the reinforced bar. The above arrangement increases the strength of the housing and improves the heat dissipation performance.

According to a second aspect of the present disclosure, an electric machine is provided. The electric machine comprises the housing described in the above first aspect.

It should be appreciated that the contents described in this Summary are not intended to identify key or essential features of embodiments of the present disclosure, or limit the scope of the present disclosure. Other features of the present disclosure will be understood more easily through the following description.

BRIEF DESCRIPTION OF THE DRAWINGS

Through the following more detailed description of the example embodiments with reference to the accompanying drawings, the above and other objectives, features and advantages of the present disclosure will become more apparent. In the example embodiments of the present disclosure, same reference sign usually indicates the same component.

Throughout the drawings, same or similar reference signs indicate same or similar elements.

DETAILED DESCRIPTION OF EMBODIMENTS

The present disclosure is now described with reference to several example embodiments. It should be appreciated that description of those embodiments is merely to enable those skilled in the art to better understand and further implement the present disclosure and is not intended for limiting the scope disclosed herein in any manner.

As used herein, the term "includes" and its variants are to be read as open-ended terms that mean "includes, but is not limited to." The term "based on" is to be read as "based at least in part on." The terms "one embodiment" and "embodiment" are to be read as "at least one example embodiment." The term "a further embodiment" is to be read as "at least one further embodiment." The terms "first", "second" and so on can refer to same or different objects. The following text may comprise other explicit and implicit definitions. The definitions of the terms should remain consistent throughout the description unless indicated otherwise.

Electric machine is a kind of equipment that realizes energy conversion according to the law of electromagnetic induction commonly used in the industrial field. The electric machine often mentioned in the art generally includes motors that convert electric energy into mechanical energy and generators that convert mechanical energy into electric energy. The concept of the present invention is described below mainly by taking a motor as an example. It should be understood that the concept of the invention is also applicable to generators and other devices having similar principles and structures to the motor or generator.

Figure 1:
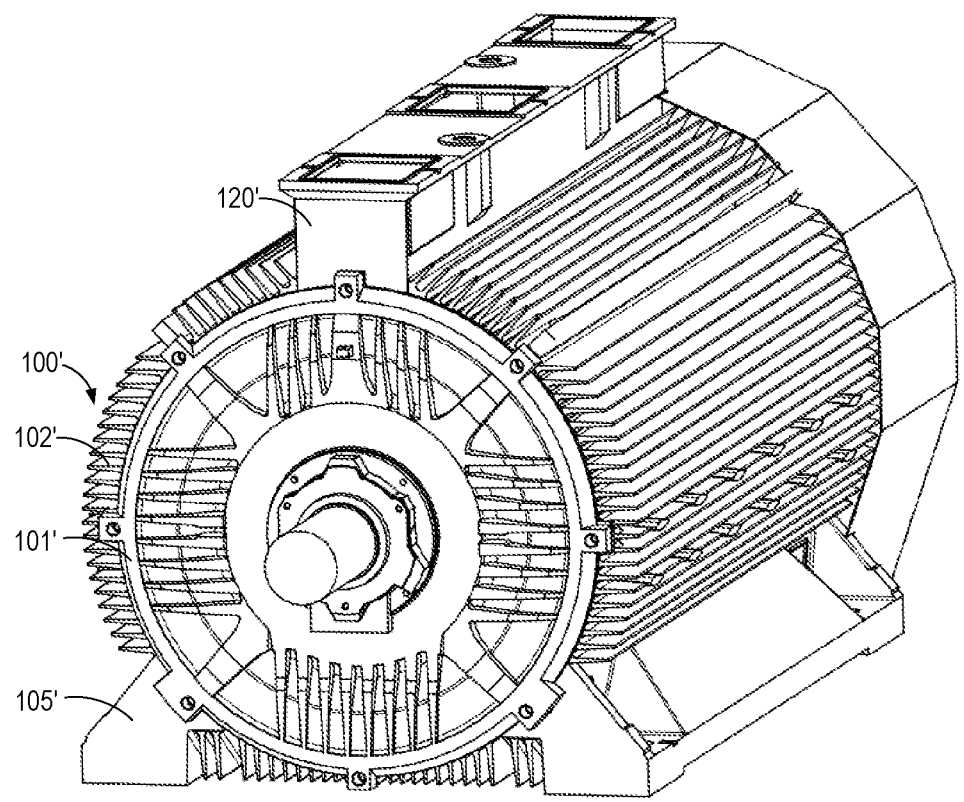
FIG. 1 illustrates a perspective view of the electric machine in the prior art.

FIG. 1 illustrates a perspective view of the electric machine in the prior art. As shown, a housing 100' of the traditional electric machine includes radiations ribs 102' formed outside a body 101'. The radiation ribs 102' circumferentially arranged outside the body 101' help to increase the heat dissipation area, which is beneficial to heat dissipation of the electric machine. In addition, to promote air flow between inside and outside of the electric machine and further facilitate heat dissipation, an internal fan and an external fan are generally provided inside and outside an air-cooled electric machine, and a plurality of ventilation ducts are also arranged external to the electric machine. For example, as illustrated in FIG. 1, three ventilation ducts are provided on the housing 100' of the electric machine. Two of them are respectively arranged in a pair of support parts 105' of the electric machine along an axial direction, while the other ventilation duct 120' is arranged at an upper part of the housing 100'.

For the purpose of heat dissipation, the running internal and external fans of the electric machine respectively form an internal heat radiating airstream and an external heat radiating airstream to accelerate air flow inside and outside the electric machine. The internal fan arranged at one end in the housing of the electric machine, upon rotation, generates a pressure difference between two ends within the housing of the electric machine, to promote the formation of the internal heat radiating airstream. The ventilation duct 120' is in communication with the interior of the electric machine, such that the internal heat radiating airstream within the electric machine may flow through the ventilation duct 120' to radiate the heat.

It can be seen from FIG. 1 that the ventilation duct 120' protrudes outward directly from the body 101' in a radial direction. Radiation ribs cannot be provided at a position where the ventilation duct is already arranged. The problem that this brings is that the heat dissipation area of this region is significantly reduced due to the lack of radiation ribs. Even though there is airstream flowing in the ventilation duct, it is difficult to radiate the heat accumulated around this region of the electric machine due to a remarkable decrease of the heat dissipation area and the local temperature of this region eventually goes up. Likewise, as radiation ribs are also not allowed to be provided near the position of the ventilation ducts arranged inside the support parts 105', it also causes high local temperature of the support parts.

The above issue is increasingly prominent under the trend of continuous pursuit of maximizing output power. The greater the output power, the more obvious the heat accumulation, which leads to an unacceptable local overheating. The so called "unacceptable" means that such local overheating will be detrimental to the performance and service life of the electrical machine. Accordingly, it is required to strictly control the output power of the electric machine using the housing in the above arrangement to avoid the unacceptable local overheating. This in turn also restricts technical improvement and development of the electric machine to some extent.

To solve or at least partially solve the above or other potential issues in the prior art, embodiments of the present disclosure provide a housing 100 of the electric machine. The heat energy of the electric machine using the housing 100 is distributed more uniformly, which can effectively avoid the local overheating. Meanwhile, the output power can be increased to satisfy the requirements for the development trend of large-power and small-volume electric machines.

Figure 2:
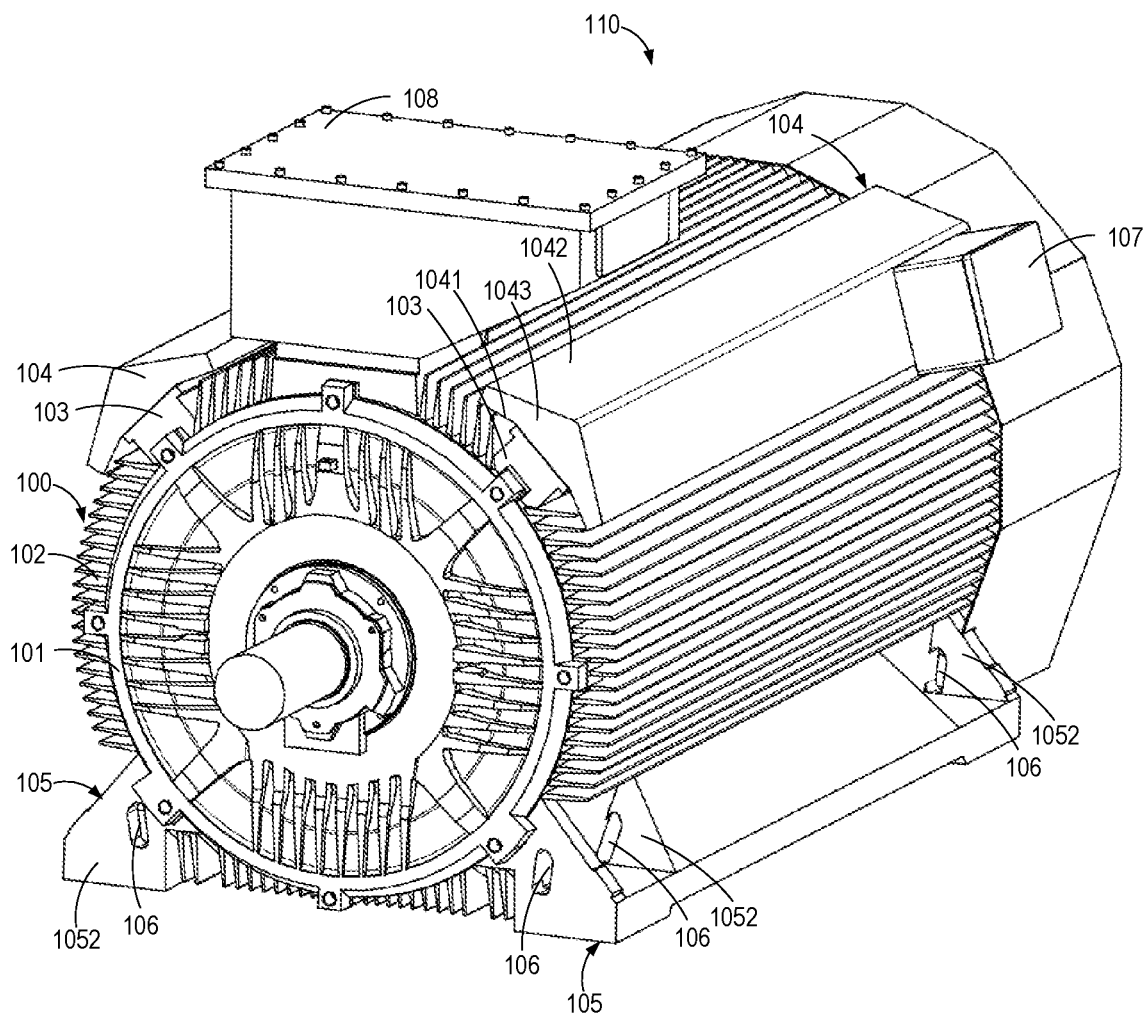
FIG. 2 illustrates a perspective view of an electric machine in accordance with embodiments of the present disclosure.
Figure 3:
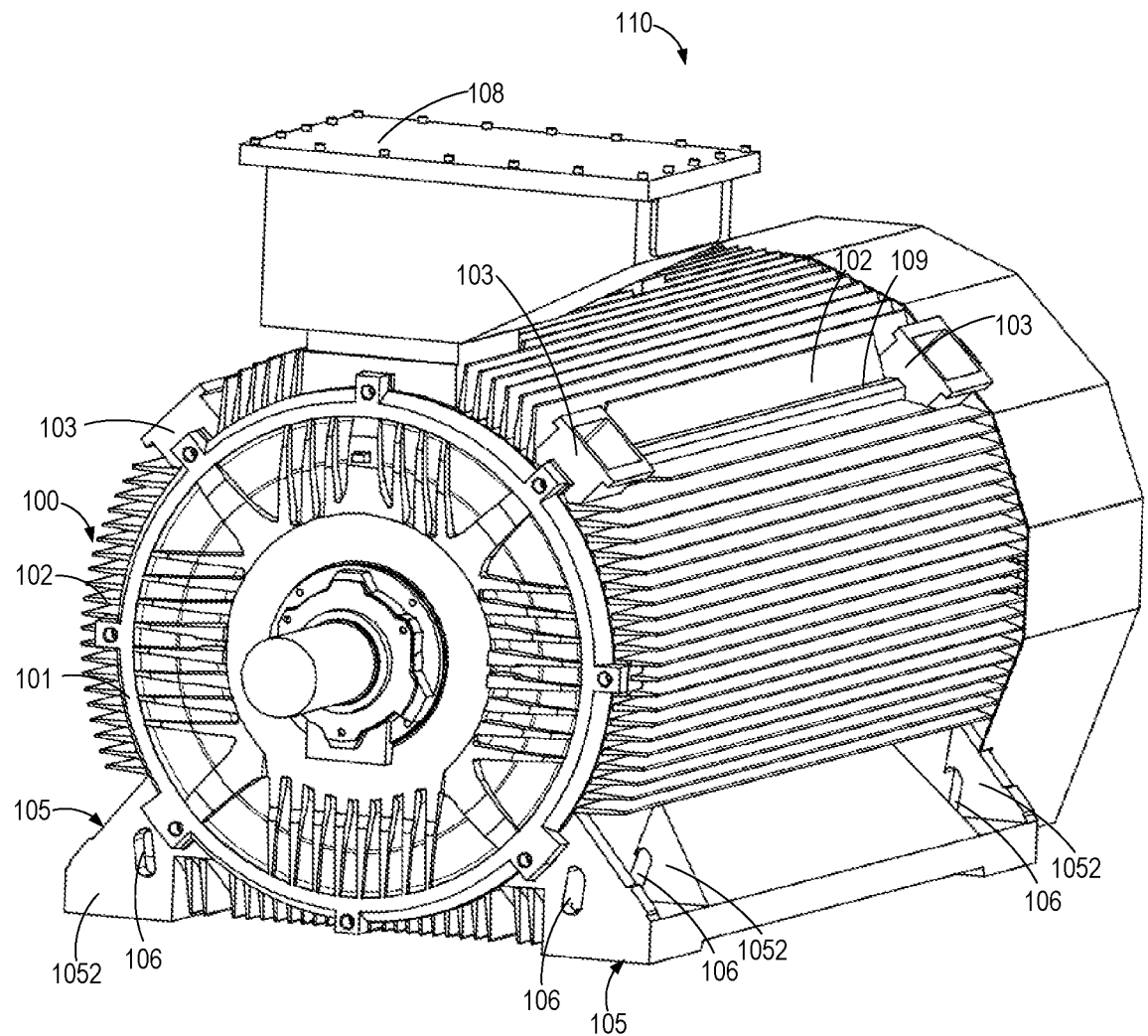
FIG. 3 illustrates a perspective view of an electric machine in accordance with embodiments of the present disclosure, in which the ventilation ducts are removed to display the ventilation windows.

FIGS. 2 and 3 illustrate perspective views of the electric machine 110 using the housing 100. In FIG. 3, the ventilation ducts at the upper left part and upper right part of the electric machine are removed to display the arrangement position of the ventilation window. As shown in FIGS. 2 and 3, the housing 100 in accordance with embodiments of the present disclosure generally comprises a body 101 and a plurality of radiation ribs 102 circumferentially arranged on the body 101. Each radiation rib 102 basically extending along an axial direction. The radiation ribs 102 can increase the heat dissipation area to timely dissipate the heat produced during the operation of the electric machine. The radiation ribs 102 may be arranged at the circumference of the body 101 in orthogonal and/or radial form. For example, as shown in FIGS. 2 and 3, the radiation ribs 120 in orthogonal form are basically divided into two groups according the extension direction, one of which extends outward circumferentially along a first direction (e.g., horizontal direction) and the other extends outward circumferentially along a second direction (e.g., vertical direction) perpendicular to the first direction. The radiation ribs 102 in each group extend in the substantially parallel direction as demonstrated by FIGS. 2 and 3. Although FIGS. 2 and 3 illustrate that the housing according to embodiments of the present disclosure uses the radiation ribs 120 in orthogonal form, it should be understood that the radiation ribs in radial form are also feasible and the same technical effects also can be achieved. The radiation ribs in radial form means that a plurality of radiation ribs extend outward from the circumference of the body 101 along a radial direction. Certainly, in some embodiments, the radiation ribs 102 one the circumference of the body 101 also may be arranged in a combined way of the orthogonal form and the radial form or in any other suitable ways.

Unlike the housing of the conventional electric machine, the ventilation ducts 104 of the housing 100 in accordance with embodiments of the present disclosure are spaced apart from the body 101 and the radiation ribs 102 in the radial direction. The arrangement facilitates the heat dissipation of the electric machine without affecting the distribution of the radiation ribs 102. In other words, for the housing 100 in accordance with embodiments of the present disclosure, it is possible to arrange radiation ribs 102 at the position where the ventilation ducts 104 are already arranged. This arrangement is achieved through the cooperation of at least one pair of ventilation windows 103 and at least one ventilation duct 104 so that the radiation ribs can be arranged between the ventilation ducts 104 and the body 101.

Specifically, the at least one pair of ventilation windows 103 of the housing 100 in accordance with embodiments of the present disclosure separately protrudes outward radially from two axial ends of the body 101. For example, the pair of ventilation windows 103 at the upper right radially protrudes outward from two ends of the body 101 in the axial direction as shown in FIG. 3, which enables a part of radiation ribs 102 to be arranged between the pair of ventilation windows 103. The pair of ventilation windows 103 at the upper left adopts the similar arrangement.

Although FIGS. 2 and 3 show a scenario where there are two pairs of ventilation windows 103 and two corresponding ventilation ducts 104, it should be understood that the above scenario is merely for illustrative purposes, without suggesting any limitation as to the scope of the present disclosure. Any other suitable numbers and arrangements are also possible. For example, in some embodiments, there may be only one pair of ventilation windows 103 and one ventilation duct 104 corresponding thereto. In such case, for a more reasonable layout, the pair of ventilation windows 103 and the ventilation duct 104 may be arranged at the same circumferential distance from other ventilation duct(s) (e.g., a ventilation duct of the support part disclosed in the following text).

In some alternative embodiments, there may also be more than two pairs of ventilation windows 103 and more than two ventilation ducts 104 corresponding thereto, e.g., three pairs of ventilation windows 103 and three ventilation ducts 104. Similarly, the ventilation ducts 104 and the ventilation windows 103 may also be uniformly arranged one the circumference of the body along with other air ducts (if any). For ease of description, embodiments of the present disclosure will be described mainly under the scenario where there are two pairs of ventilation windows 103 and two ventilation ducts 104 shown in FIGS. 2 and 3. The scenario where there are other numbers of ventilation windows 103 and ventilation ducts 104 is also similar and will not be repeated in the following.

By taking the ventilation duct 104 at the upper right in FIG. 2 as an example, it can be seen that the ventilation duct 104 in accordance with embodiments of the present disclosure is arranged radially outside the radiation ribs 102 arranged in an axial direction and is coupled to the ventilation windows 103. That is, radiation ribs 102 are radially arranged between the body 101 and the ventilation duct 104. In this way, the communication between the ventilation duct 104 and the interior of the housing 100 via the ventilation window 103 is achieved. For example, in some embodiments, the ventilation windows 103 are formed at positions corresponding to the outside of the stator of the electric machine 110 in the axial direction, i.e., the ventilation windows 103 are arranged at two ends of the body 101 in the axial direction. Because of the arrangement of the ventilation window 103 and the pressure difference between two axial ends inside the electric machine caused by the operation of the internal fan, a pressure difference is also generated at two axial ends of the ventilation duct 104, causing the internal heat radiating airstream to flow in the ventilation duct 104. In this way, the heat dissipation inside the electric machine will be accelerated.

Meanwhile, as mentioned above, the radiation ribs 102 also can be arranged at the position where the ventilation windows 103 and the ventilation duct 104 are already arranged. This effectively eliminates the problems of heat accumulation and local overheating in the traditional solution where the radiation ribs cannot be arranged at the positions of the ventilation windows. In this way, the housing in accordance with embodiments of the present disclosure can allow a higher power output in a case of using the same volume of the housing. In other words, the electric machine utilizing the housing 100 in accordance with embodiments of the present disclosure can provide a high power output without causing heat accumulation. It is quite advantageous to the performance and service life of the electric machine 110. Moreover, the electric machine may be upgraded just by replacing the traditional housing with the housing 100 in accordance with embodiments of the present disclosure. After the replacement, the original internal components of the electric machine may output a higher power without causing local overheating, which improves the performance of the electric machine and also prolongs its service life.

In some embodiments, to further enhance its strength, the housing 100 may also comprise a reinforced bar 109 formed between one pair of ventilation windows 103 as shown in FIG. 3. The radiation ribs formed between the ventilation windows 103 may be arranged on the reinforced bar 109. Such arrangement also accelerates heat transfer of this region and further avoids heat accumulation.

Figure 4:
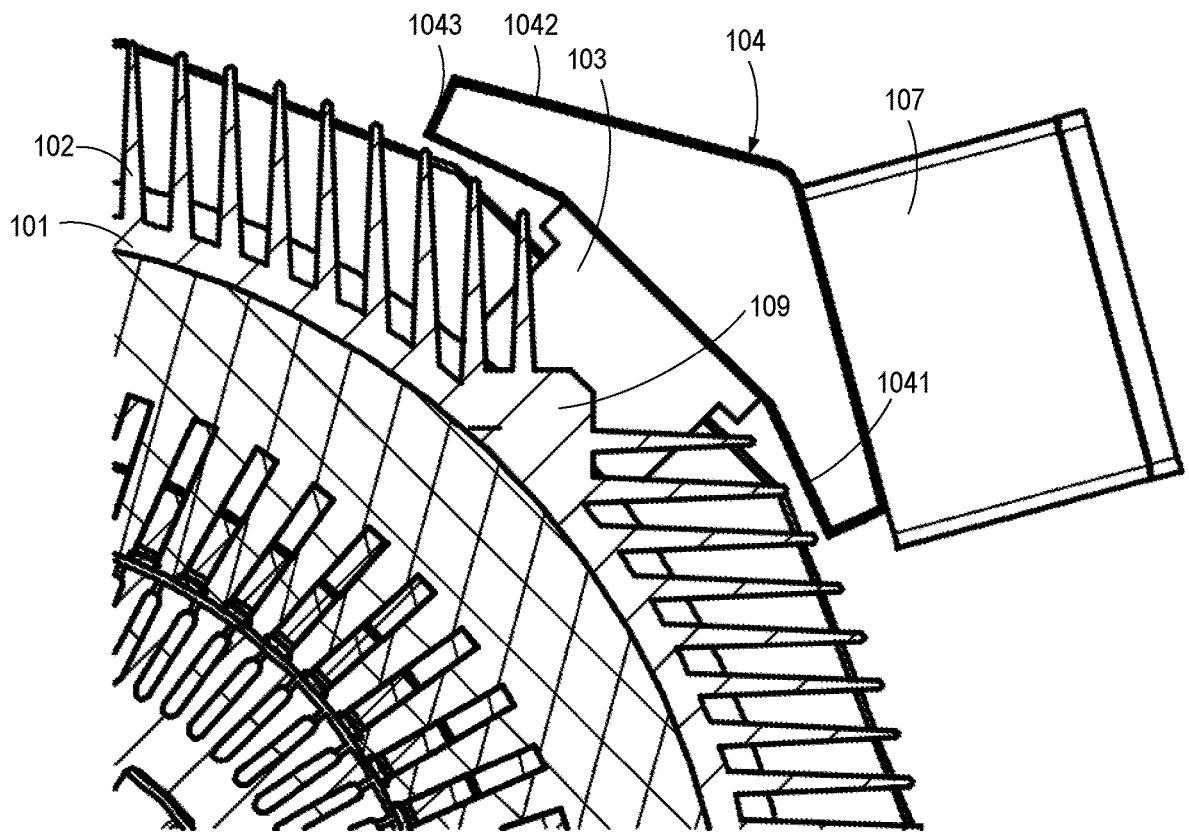
FIG. 4 illustrates an enlarged view of one ventilation duct and ventilation window of an electric machine in accordance with embodiments of the present disclosure.

FIG. 4 illustrates an enlarged side view of the ventilation window 103 and the ventilation duct 104 of the housing 100 of the electric machine shown in FIG. 2. As shown, in some embodiments, the ventilation duct 104 may comprise a radial inner sidewall 1041, a radial outer sidewall 1042 and a circumferential wall 1043 formed between the radial inner sidewall 1041 and the radial outer sidewall 1042. The circumferential wall 1043 is formed around the ventilation duct 104 and may comprise end walls between the axial ends of the radial inner sidewall 1041 and the radial outer sidewall 1042 and sidewalls extending axially. In this way, the radial inner sidewall 1041, the radial outer sidewall 1042 and the circumferential wall 1043 collectively enclose the interior space of the ventilation duct 104.

In some embodiments, the radial inner sidewall 1041 comprises an opening that is aligned with the ventilation window 103 and coupled to the ventilation window 103 hermitically. In this way, the interior space of the ventilation duct 104 is in communication with the inside of the electric machine. As mentioned above, during the operation of the internal fan, a pressure difference is also formed between the axial ends of the interior space of the ventilation duct 104 just like the pressure difference inside the housing 100, thereby enabling the flow of the internal heat radiating airstream in the ventilation duct 104.

As shown in FIG. 4, the radial inner sidewall 1041 generally conforms to the external contour of the radiation ribs 102 in the circumferential direction, i.e., a roughly cylindrical profile. The structure of the radial inner sidewall 1041 in the circumferential direction may be implemented by bending a sheet metal according to FIG. 4. For example, the sheet metal may be bent at a plurality of positions to conform the radial inner sidewall 1041 to the external contour of the radiation ribs 102 as much as possible. The use of this bending approach can decrease the processing difficulty and lower processing costs. In some alternative embodiments, the radial inner sidewall 1041 also may be compression molded or processed in any other suitable ways into a curve profile conforming to the external contour of the radiation ribs 102 when observed in the axial direction.

The radial inner sidewall 1041 is radially spaced apart from the radiation ribs 102 by a predetermined distance. In this way, the radial inner sidewall 1041 may radially cover at least a part of the radiation ribs 102 from the outside. It can be seen that covering the radiation ribs 102 with the radial inner sidewall 1041 keeps a predetermined distance between the radial inner side wall and the radiation ribs. This can facilitate the rapid flow of the external heat radiating airstream along the radiation ribs 102 to facilitate heat dissipation. In addition, the predetermined distance may be a range, e.g., from 1 mm to 15 mm or more.

FIG. 4 also illustrates the structure of the radial outer sidewall 1042. In some embodiments, the radial outer sidewall 1042 may be formed to bend by a predetermined angle along a bending part extending axially as shown in FIG. 4. In this way, the distance from the radial outer sidewall 1042 to the radial inner sidewall 1041 decreases gradually from the bending part. The interior space formed by the above arrangement promotes the air flow to further accelerate the heat dissipation. Furthermore, it is easy to radiate the heat outwardly with the structure of the radial outer sidewall 1042.

The above mentioned structures of the ventilation windows 103 and the ventilation duct 104 may be applied into any suitable housing with the radiation ribs despite the housing is provided with the support part 105 for securing the electric machine or not. For example, in the existing or to be developed housing 100 without the support part 105 (e.g., employing other support or suspension structures), the structures of the ventilation windows 103 and the ventilation duct 104 may be uniformly distributed at the circumference of the body 101.

As shown in FIGS. 2 and 3, for embodiments where there are support parts 105 protruding from the body 101 to secure the electric machine, the inventor also improves the heat dissipation around air ducts of support part 1051 axially extending within the support parts 105, to avoid the heat accumulation at or near the position.

Figure 5:
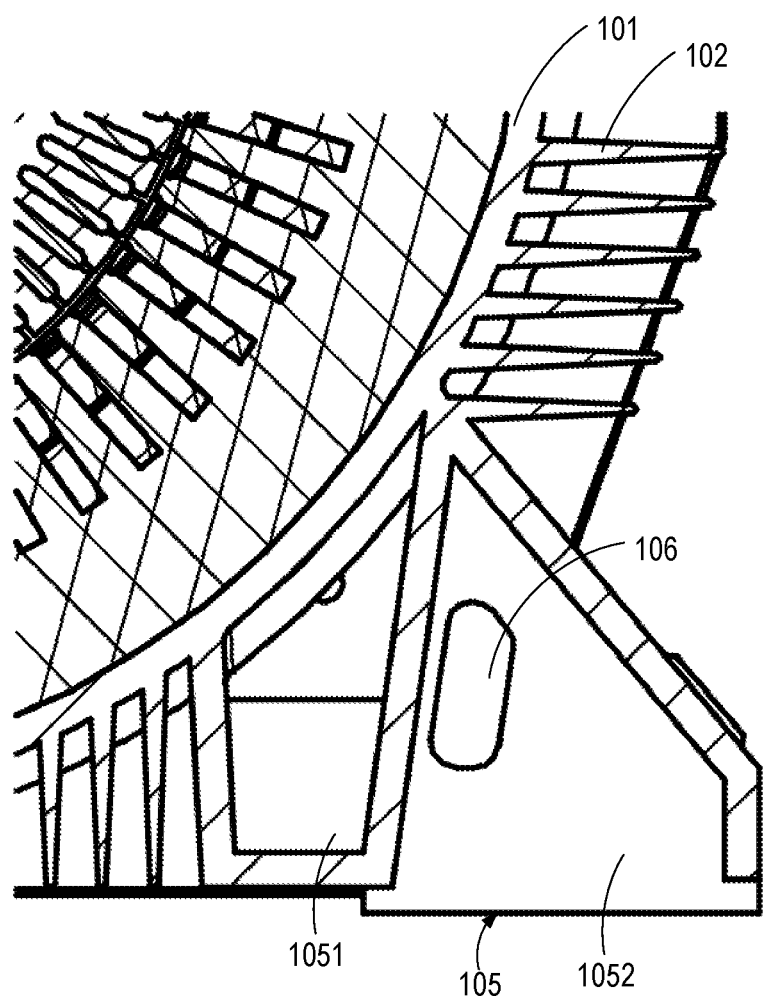
FIG. 5 illustrates an enlarged view of support parts of an electric machine in accordance with embodiments of the present disclosure.

Specifically, in some embodiments, a plurality of auxiliary ventilation holes 106 are formed on a plurality of reinforced rib plates 1052 arranged external to the air duct of support part 1051 according to FIG. 5. The plurality of auxiliary ventilation holes 106 each run through the corresponding reinforced rib plates 1052 and are aligned in the axial direction. In this way, a part of the external heat radiating airstream of the electric machine may flow axially external to the air duct of support part 1051, to facilitate heat dissipation around the air duct of support part 1051. In this way, the heat accumulation and local overheating around the air duct of support part 1051 can be avoided, thereby further improving the performance of the electric machine and prolong its service life.

In some embodiments, the body 101, the plurality of radiation ribs 102, the support parts 105 and the plurality of auxiliary ventilation holes 106 may be integrally formed by casting, to increase the strength of the housing 100 while reducing its process complexity. The integral structure also facilitates heat dissipation. In some embodiments, the ventilation windows 103 may also be formed integrally with the body 101. Certainly, in some alternative embodiments, the ventilation windows 103 may also be fitted to the body. Alternatively or additionally, the ventilation windows 103 may also be formed integrally with the ventilation duct 104.

In some embodiments, the ventilation duct 104 may be formed from the sheet metal parts, for example, by punching and is coupled to the ventilation windows 103 by assembly. Such arrangement lowers the manufacturing difficulty and improves the assembling efficiency.

In some embodiments, the housing 100 may also comprise an electrical box 107 provided on the radial outer sidewall 1042 of the ventilation duct 104 as shown in FIGS. 2 and 4. The electrical box 107 may be used for accommodating electronic elements of the electric machine. In some embodiments, the electronic elements in the electrical box 107 may be coupled to the internal components of the electric machine 100 via the cables passing through the ventilation windows 103. This makes the overall layout of the housing of the electric machine more reasonable, thereby facilitating the circuit design of the electric machine. Furthermore, by disposing a part of the electronic elements in the electrical box 107, a main electrical box 108 for purposes such as power distribution or the like may be downsized, to occupy the space of the radiation ribs 102 as little as possible.

For example, as shown in FIGS. 2 and 3, the main electrical box 108 can accommodate the required electronic elements only by occupying half or less of the length of the body 101 in the axial direction. In addition, the main electrical box 108 may also be designed to have a wide upper portion and a narrow lower portion as demonstrated in FIG. 3. That is, a small window protrudes from the body 101 and a receiving part having an inverted conical shape is arranged at an end of the window away from the body 101. The above arrangement allows as many radiation ribs as possible to be arranged, to increase the heat dissipation area and reduce heat accumulation.

From the above description, by adopting the ventilation duct 104 radially spaced apart from the radiation ribs 102, the radiation ribs 102 can be arranged at the positions where the ventilation duct 104 is already arranged, to effectively avoid heat accumulation at the position of the ventilation duct in the conventional housing and increase the power density allowed by the housing 100. As a result, the electric machine may output more power without causing heat accumulation and the service life of the electric machine is also extended.

An electric machine 110 comprising the above described housing 110 is also provided in accordance with embodiments of the present disclosure, to boost the performance of the electric machine 100, avoid local overheating and prolong the service life simultaneously.

It also should be understood that the above detailed embodiments of the present disclosure are provided only for illustrating or explaining the principles of the present disclosure by examples, rather than restricting the present disclosure. Any modifications, equivalent substitutions, improvements and the like should be encompassed within the protection scope of the present utility model as long as they are within the spirit and principle of the present utility model. Meanwhile, the claims attached to the present disclosure are intended to cover all changes and modifications within scope and border of the claims or equivalents thereof.

What is claimed is:

1. A housing of an electric machine, comprising:
   a body formed into a cylindrical structure extending along an axial direction;
   a plurality of radiation ribs extending outward from a circumference of the body and extending along the axial direction;
   at least one pair of ventilation windows comprising a first ventilation window radially protruding outward from a first end of the body and a second ventilation window radially protruding outward from a second end of the body, wherein the first end of the body is opposite from the second end of the body along the axial direction so as to allow one or more radiation ribs of the plurality of radiation ribs to be arranged between the first ventilation window and the second ventilation window; and
   at least one ventilation duct arranged radially outside the radiation ribs along the axial direction and coupled to the at least one pair of ventilation windows, to enable an internal heat radiating airstream within the electric machine to flow through the ventilation duct, wherein the at least one ventilation duct comprises:
      an inner sidewall extending along the axial direction, the inner sidewall defining a first opening aligned with the first ventilation window in a radial direction and a second opening aligned with the second ventilation window in the radial direction.

2. The housing of claim 1, further comprising:
   a support part protruding outward from the body for securing the electric machine and comprising an air duct of support part extending axially and a plurality of reinforced rib plates axially arranged outside the air duct of support part; and
   a plurality of auxiliary ventilation holes respectively formed to run through the reinforced rib plates and axially aligned, to enable a part of an external heat radiating airstream of the electric machine to axially flow outside the air duct of support part.

3. The housing of claim 1, wherein the ventilation duct comprises a radial inner sidewall, a radial outer sidewall and a circumferential wall formed between the radial inner sidewall and the radial outer sidewall, to collectively enclose an interior space of the ventilation duct.

4. The housing of claim 3, wherein the radial inner sidewall comprises an opening adapted to be hermetically coupled to the ventilation windows, to allow the interior space of the ventilation duct to communicate with inside of the electric machine; and
   the radial inner sidewall is formed to circumferentially conform to an external contour of the radiation ribs, and is radially spaced apart from the radiation ribs by a predetermined distance, so as to radially cover at least a part of the radiation ribs from the outside.

5. The housing of claim 3, wherein the radial outer sidewall is formed to bend by a predetermined angle along a bending part extending axially, such that a distance between the radial outer sidewall and the radial inner sidewall decreases gradually from the bending part.

6. The housing of claim 1, wherein the ventilation duct is made of sheet metal parts.

7. The housing of claim 3, further comprising:
an electrical box arranged on the radial outer sidewall of the ventilation duct, for electronic elements of the electric machine to be arranged therein, wherein the electronic elements are configured to pass through the ventilation window.

8. The housing of claim 1, wherein at least one pair of ventilation windows is formed at positions corresponding to outside of a stator of the electric machine in the axial direction.

9. The housing of claim 1, wherein the body, the plurality of radiation ribs and a support part are formed integrally by casting.

10. The housing of claim 1, further comprising:
a reinforced bar formed between the at least one pair of ventilation windows and extending axially, and
a part of the plurality of radiation ribs is formed on the reinforced bar.

11. An electric machine, comprising the housing according to claim 1.

12. The housing of claim 4, further comprising:
an electrical box arranged on the radial outer sidewall of the ventilation duct, for electronic elements of the electric machine to be arranged therein, wherein the electronic elements are configured to pass through the ventilation window.

13. The housing of claim 5, further comprising:
an electrical box arranged on the radial outer sidewall of the ventilation duct, for electronic elements of the electric machine to be arranged therein, wherein the electronic elements are configured to pass through the ventilation window.

14. The housing of claim 2, further comprising:
a reinforced bar formed between the at least one pair of ventilation windows and extending axially, and
a part of the plurality of radiation ribs is formed on the reinforced bar.

15. The housing of claim 3, further comprising:
a reinforced bar formed between the at least one pair of ventilation windows and extending axially, and
a part of the plurality of radiation ribs is formed on the reinforced bar.

16. The housing of claim 4, further comprising:
a reinforced bar formed between the at least one pair of ventilation windows and extending axially, and
a part of the plurality of radiation ribs is formed on the reinforced bar.

17. The housing of claim 5, further comprising:
a reinforced bar formed between the at least one pair of ventilation windows and extending axially, and
a part of the plurality of radiation ribs is formed on the reinforced bar.

18. The housing of claim 8, further comprising:
a reinforced bar formed between the at least one pair of ventilation windows and extending axially, and
a part of the plurality of radiation ribs is formed on the reinforced bar.

19. An electric machine, comprising the housing according to claim 3.

20. An electric machine, comprising the housing according to claim 4.

* * * * *